US009173190B2

(12) United States Patent
Teague et al.

(10) Patent No.: US 9,173,190 B2
(45) Date of Patent: Oct. 27, 2015

(54) SYSTEM AND METHOD FOR CONTROLLING PAGING DELAY

(75) Inventors: Edward Harrison Teague, San Diego, CA (US); Qingjiang Tian, San Diego, CA (US); David Jonathan Julian, San Diego, CA (US); Zhanfeng Jia, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 13/538,894

(22) Filed: Jun. 29, 2012

(65) Prior Publication Data
US 2014/0004899 A1 Jan. 2, 2014

(51) Int. Cl.
*H04B 7/00* (2006.01)
*H04W 68/02* (2009.01)

(52) U.S. Cl.
CPC .................................... *H04W 68/02* (2013.01)

(58) Field of Classification Search
CPC ..... H04W 68/00; H04W 4/005; H04W 28/18; H04W 48/08; H04W 4/16
USPC .................................................. 455/458, 515
See application file for complete search history.

(56) References Cited

U.S. PATENT DOCUMENTS

| 5,119,397 | A  | * | 6/1992 | Dahlin et al. ................. 375/216 |
| 6,445,915 | B1 |   | 9/2002 | Baiyor et al. |
| 6,717,915 | B1 |   | 4/2004 | Liao et al. |
| 7,200,412 | B2 | * | 4/2007 | Kim .............................. 455/458 |
| 7,529,211 | B2 |   | 5/2009 | Narasimha et al. |
| 7,983,702 | B2 |   | 7/2011 | Li et al. |
| 8,391,897 | B1 | * | 3/2013 | Oroskar et al. ............... 455/458 |
| 8,433,345 | B2 | * | 4/2013 | Li et al. ........................ 455/458 |
| 8,543,138 | B2 | * | 9/2013 | Teauge et al. ................. 455/458 |
| 2002/0090959 | A1 | * | 7/2002 | Laroia et al. ................. 455/458 |
| 2008/0178003 | A1 |   | 7/2008 | Eastham et al. |
| 2009/0149185 | A1 | * | 6/2009 | Narasimha .................... 455/442 |
| 2009/0258663 | A1 |   | 10/2009 | Xu |
| 2011/0223942 | A1 |   | 9/2011 | Xu et al. |

FOREIGN PATENT DOCUMENTS

| EP | 347167 A2 | * | 12/1989 | ............... H04B 7/26 |
| EP | 501282 A1 | * | 9/1992 | ............... H04Q 7/02 |
| EP | 618742 A2 | * | 10/1994 | ............... H04Q 7/02 |
| GB | 2177244 A | * | 1/1987 | ............... H04B 5/04 |
| GB | 2253972 A | * | 9/1992 | ............ H04B 7/005 |
| WO | WO 9608941 A2 | * | 3/1996 | ............... H04B 5/02 |
| WO | 9742787 A2 |  | 11/1997 |  |
| WO | 2011079574 A1 |  | 7/2011 |  |

OTHER PUBLICATIONS

International Search Report and Written Opinion—PCT/US2013/048644—ISAEPO—Oct. 4, 2013.

* cited by examiner

*Primary Examiner* — Edward Urban
*Assistant Examiner* — Max Mathew
(74) *Attorney, Agent, or Firm* — Paul S. Holdaway

(57) ABSTRACT

The disclosure relates to systems and methods for controlling a delay probability distribution associated with receiving a response to a page. The method entails performing a series of page operations, wherein each page operation entails transmitting a page and scanning for a page response. The method further entails adjusting at least one timing parameter associated with performing the series of page operations based on a characteristic of one or more scans for the page performed by the at least one remote device. The characteristic may be the period of periodic page scans performed by the at least one remote device.

56 Claims, 6 Drawing Sheets

SYSTEM AND METHOD FOR CONTROLLING PAGING DELAY

FIELD

The present disclosure relates generally to communication systems, and more specifically, to a system and method for controlling a delay associated with successfully paging a remote wireless communication device.

BACKGROUND

In many communication systems, two or more wireless devices may communicate data between each other by way of a dedicated communication channel. Typically, prior to the establishment of the dedicated channel, the wireless devices undergo a channel setup procedure which involves communicating one or more channel parameters between each other. Once the channel parameters are set, the wireless devices may communicate with each other by way of the dedicated channel.

Often, a common or a priori communication channel exists between the wireless devices. The common communication channel may be used by wireless devices to set up dedicated wireless channels. More specifically, the wireless devices communicate the one or more channel parameters associated with establishing the dedicated channel using the common communication channel. In order to initiate the setup of the dedicated channel, an initiating device may perform a paging procedure to page a responding device.

In some systems, the initiating device may perform the paging procedure before discovering the responding device. In this regard, the initiating device may perform a paging procedure to learn the identity and/or other information about the responding device. In the same or other systems, the initiating device may perform the paging procedure after the responding device has been discovered. In this regards, the initiating device may perform a paging procedure to establish a dedicated channel with the responding device. This may involve exchanging authentication and/or other information to determine whether the dedicated channel is authorized.

In some systems, the initiating device performs a paging procedure by periodically performing paging operations, wherein each operation comprises a transmission of a page followed by scan for a response to the page. In some systems, the responding device may also periodically scan for the page, and when the responding device successfully receives a page from the initiating device, the responding device transmits a page response to the initiating device. Although, in this example, the initiating device performs the paging operations and the responding device performs the page scans, generally both devices perform their own paging operations and page scans.

Often, in some systems, the paging operations performed by the initiating device are asynchronous with the page scans performed by the responding device. In such a case, the responding device may fail to receive the page during one or more page scans. This may be the case when a page scan performed by the responding device occurs at the same time as a response scan performed by the initiating device. In other words, both devices are listening, and, consequently, the responding device fails to receive a page from the initiating device. The asynchronous timing between the paging operations and the page scans may be such that multiple page scan cycles fail before eventually one succeeds. This may result in an undesirable delay in successfully paging the responding device.

SUMMARY

An aspect of the disclosure relates to a method of controlling a delay distribution associated with receiving a response to a page. The method comprises performing a series of page operations, wherein each page operation comprises transmitting a page and scanning for a page response. The method further comprises adjusting at least one timing parameter associated with performing the series of page operations based on a characteristic of one or more scans for the page performed by at least one remote device.

In another aspect of the disclosure, the at least one timing parameter comprises a duration of the page. In still another aspect, the at least one timing parameter comprises a duration of the scanning for the page response. In yet another aspect, the page operations prior to adjustment are intended for another remote device, and the page operations after the adjustment are intended for the at least one remote device. In an additional aspect, the method comprises readjusting the at least one timing parameter over time in an attempt to receive the page response from the at least one remote device.

In another aspect of the disclosure, the method comprises adjusting the at least one timing parameter based on a failure to receive the page response from the at least one remote device. In still another aspect, the method comprises adjusting the at least one timing parameter based on a type of data for communication with the at least one remote device. In yet another aspect, the method comprises adjusting the at least one timing parameter based on a type of application to be performed with the at least one remote device.

In another aspect of the disclosure, the one or more page scans performed by the at least one remote device comprises periodic page scans, and wherein the characteristic of the one or more page scans comprises a period of the periodic page scans. In still another aspect, the method comprises determining the period of the periodic page scans. In yet another aspect, the method comprises determining the period of the periodic page scans in response to a discovery paging procedure performed with the at least one remote device. In an additional aspect, the method comprises determining the period of the periodic page scans based on a standard.

In another aspect of the disclosure, the method comprises adjusting the at least one timing parameter based on information related to a probability distribution associated with a delay in receiving the page response. In yet another aspect, the method comprises transmitting the page by way of a wireless communication channel, and receiving the page response by way of the same wireless communication channel. In still another aspect, the method comprises suspending the transmission of the page during the scanning for the page response, and suspending the scanning for the page response during the transmission of the page.

Other aspect of the disclosure relates to apparatus, components, modules, devices, encoded computer-readable storage mediums, and other elements configured to achieve the operations in accordance with the aforementioned method. In general, other aspects, advantages and novel features of the present disclosure will become apparent from the following detailed description of the disclosure when considered in conjunction with the accompanying drawings.

The word "exemplary" is used herein to mean "serving as an example, instance, or illustration." Any aspect described herein as "exemplary" is not necessarily to be construed as preferred or advantageous over other aspects."

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
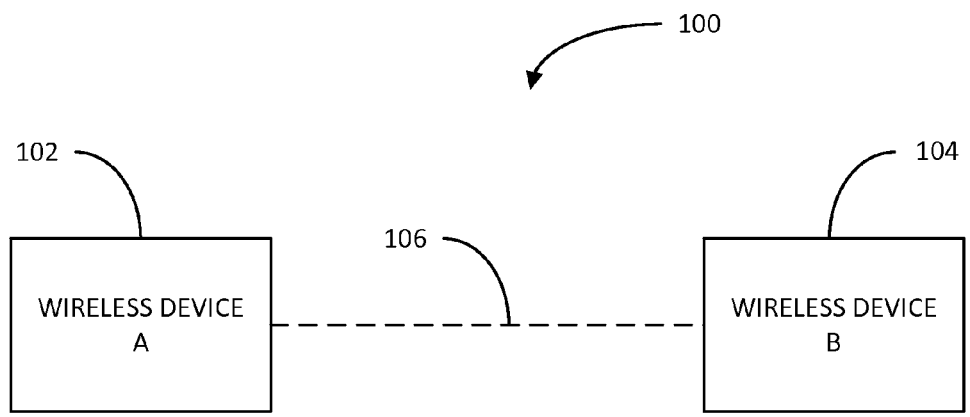
FIG. 1 illustrates a block diagram of an exemplary communication system in accordance with an aspect of the disclosure.

FIG. 1A illustrates a block diagram of an exemplary communication system 100 in accordance with an aspect of the disclosure. The communication system 100 comprises a wireless device "A" 102 and a wireless device "B" 104. The wireless devices 102 and 104 may communicate with each other by way of a wireless communication channel 106. The wireless communication channel 106 may be a common channel shared by devices 102 and 104, as well as other devices, and a priori known to the devices. Alternatively, the wireless communication channel 106 may be a dedicated communication link between the devices 102 and 104, as well as other devices.

In the examples provided herein, wireless device A 102 serves as an example of a device attempting to page wireless device B 104 in order to establish a communication channel with wireless device B 104. In some situations, wireless device A 102 may not be aware of the presence of wireless device B 104, and the paging performed may be pursuant to a discovery operation in order to attempt to learn of the identities of nearby devices, such as wireless device B 104. In such situations, the communication channel that may be established after a successful paging operation may be a common or a dedicated communication channel. In other situations, wireless device A 102 may already be aware of the presence of wireless device B 104, and the paging performed may be for the purpose of establishing a dedicated communication channel between the devices in order to communicate traffic data and/or other types of data.

In this example, wireless device A 102 may attempt to page wireless device B 104 by performing a series of paging operations. Each paging operation may comprise an interval where wireless device A 102 transmits the page, and another interval where wireless device A 102 scans for a response from wireless device B 104 (or another device). The wireless device A 102 may perform the paging operations in a periodic and consecutive manner, or in other manners. The wireless device A 102 may transmit the page by way of a wireless communication channel, and scan for a response from wireless device B 104 by way of the same wireless communication channel or a different channel. The wireless device A 102 may perform each paging operation by transmitting the page while not scanning for the page response, and then perform the scanning for the page response while not transmitting the page.

In this example, the wireless device B 104 may also perform a series of scans for the page transmitted by wireless device A 102. The wireless device B 104 may perform the series of scans in a periodic manner, or in other manners. In between scans, the wireless device B 104 may configure its receiver in a mode that it is not capable of receiving the page from wireless device A 102 in order to conserve power. In this regard, for example, wireless device B 104 may disable one or more components of its receiver, or configure its receiver in a lower power consumption mode. Additionally, in order to conserve power, the wireless device B 104 may perform the page scans in a relatively infrequent manner as compared to the frequency in which the paging operations are performed by wireless device A 102. In other words, many repetitions of the page operations may occur for every page scan performed by wireless device B 104.

In some situations, the wireless device A 102 may perform the series of page operations independent of the series of page scans performed by wireless device B 104. In other words, the page operations are asynchronous with the page scans. In such asynchronous operations, there may be a substantial delay associated with wireless device A 102 receiving a page response from wireless device B 104. The delay may be associated with multiple occurrences of wireless device B 104 performing a page scan at the same time as wireless device A 102 performs a response scan. In other words, both devices are scanning or listening at the same time. Or, said differently, wireless device B 104 misses receiving the page because it scans or wakes up when wireless device A 102 is not transmitting the page. This is explained further with reference to the following example.

Figure 2:
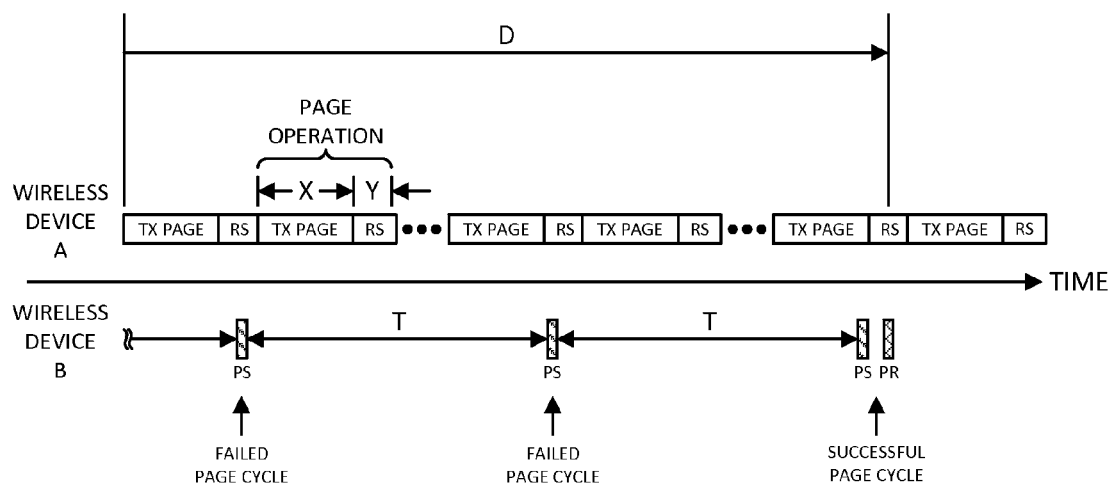
FIG. 2 illustrates a timing diagram of exemplary paging operations and page scans implemented by respective devices of an exemplary communication system in accordance with another aspect of the disclosure.

FIG. 2 illustrates a timing diagram of exemplary paging operations and page scans implemented by respective wireless devices 102 and 104 of the exemplary communication system 100 in accordance with another aspect of the disclosure. The horizontal axis, as indicated by the arrowed line labeled "TIME", represents time. Examples of the series of page operations performed by wireless device A 102 are illustrated above the horizontal time axis. Examples of the series of page scans performed by wireless device B 104 are illustrated below the horizontal time axis.

More specifically, as exemplified, wireless device A 102 may perform the series of page operations in a repetitive and consecutive manner. Each page operation comprises an interval in which the page is transmitted, and a following interval in which a scan for a page response (RS) is performed. In this example, the page transmission interval has a duration of X, and the response scan interval has a duration of Y. Wireless device B may perform scans for the page (PS) in a repetitive manner, for example, with a period of T. As previously mentioned, for power conservation purposes, the period T associated with the page scans performed by wireless device B 104 may be relatively large as compared to the period associated with the page operations performed by wireless device A 102.

Since, as previously discussed, the page operations performed by wireless device A 102 may be independent of the page scans (PS) performed by wireless device B 104, there may be multiple occurrences where the page scan (PS) performed by wireless device B 104 occurs at the same time as the response scan (RS) performed by wireless device A 102. For instance, in the example of FIG. 2, the first indicated page scan (PS) performed by wireless device B 104 occurs at the same time as a response scan (RS) is performed by wireless device A 102. Accordingly, wireless device B 104 fails to receive the page from wireless device A 102 during this page scan cycle. Similarly, the following indicated page scan (PS) performed by wireless device B 104 also occurs at the same time as a response scan (RS) is performed by wireless device A 102, resulting in another failed page scan cycle.

In this example, the third indicated page scan (PS) performed by wireless device B 104 occurs at the same time as the transmission of the page by wireless device A 102. Accordingly, wireless device B 104 receives the page from wireless device A 102. In response to receiving the page, wireless device B 104 transmits a page response (PR) during the time interval (RS) that wireless device A 102 is scanning for the response. Thus, wireless device A 102 receives the page response (PR) from wireless device B 104, resulting in a successful page cycle, as indicated. Based on a priori knowledge of the page operations of wireless device A 102, wireless device B 104 may be able to transmit the page response (PR) during the response scan (RS) performed by wireless device A 102. For example, wireless device B 104 may be configured to transmit the page response within a predetermined time period after receiving the page.

As this example illustrates, because of the asynchronous relationship between the page operations performed by wireless device A 102 and the page scans performed by wireless device B 104, there may be a substantial delay associated with wireless device A 102 successfully receiving a page response from wireless device B 104. In the case where the devices 102 and 104 have not discovered each other and are performing discovery paging operations, the delay D may be measured from the time both devices 102 and 104 are proximate enough to each other to be able to receive the page response and page, respectively, to the time wireless device A 102 successfully receives a page response from wireless device B 104. In the case where the devices 102 and 104 have already discovered each other and device 102 wishes to page device 104, the delay D may be measured from the time wireless device A 102 begins paging wireless device B 104 to the time wireless device A 102 successfully receives a page response from wireless device B 104. Also, because of the asynchronous relationship between the page operations and the page scans, the delay D may vary in accordance with a probability distribution. The following describes techniques for controlling the probability distribution associated with the delay D in wireless device A 102 successfully receiving a page response from wireless device B 104.

Figure 3:
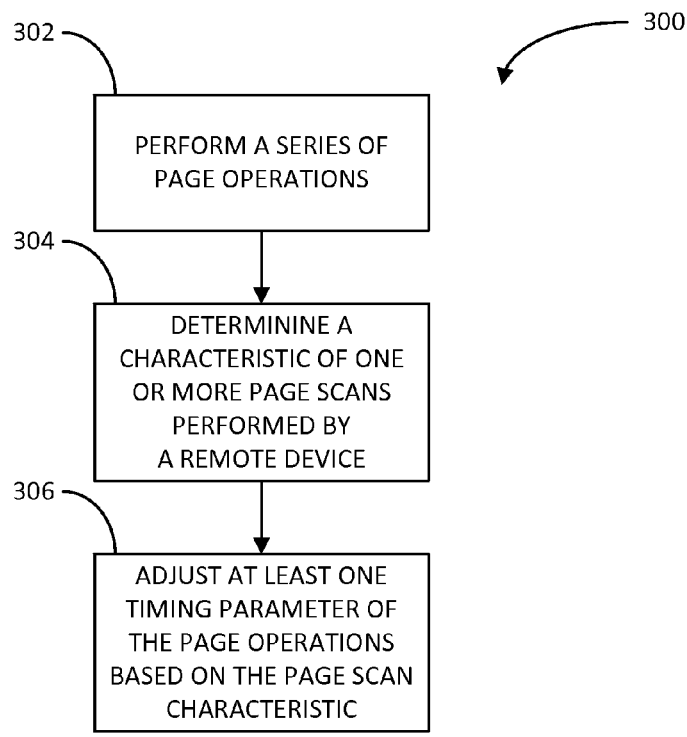
FIG. 3 illustrates a flow diagram of an exemplary method of paging a remote device in accordance with another aspect of the disclosure.

FIG. 3 illustrates a flow diagram of an exemplary method 300 of paging a remote device in accordance with another aspect of the disclosure. The operations of the method 300 may be implemented by wireless device A 102 in attempting to page wireless device B 104. According to the method 300, wireless device A 102 performs a series of page operations (block 302). As previously discussed, each page operation may comprise an interval for transmitting the page followed by an interval for scanning for the page response. Additionally, as previously discussed, the page operations may be performed in a repetitive and consecutive manner.

During the performance of the page operations, wireless device A 102 may determine a characteristic of one or more page scans performed by wireless device B 104 (block 304). For example, if wireless device B 104 performs the page scans in a periodic manner, the determined characteristic may be the period T of the page scans. Wireless device A 102 may determine the characteristic (e.g., period T) of the one or more page scans in a number of ways, for example, through a discovery procedure performed with the wireless device B 104 or by accessing information in a standard that specifies the characteristic of the one or more page scans performed by wireless device B 104. Wireless devices A 102 and B 104 may have performed the discovery procedure during a communication session prior to both devices commencing the paging operations and page scans, respectively.

Then, in accordance with the method 300, wireless device A 102 adjusts at least one timing parameter associated with the page operations based on the characteristic of one or more page scans performed by wireless device B 104 (block 306). As discussed in more detail below, examples of adjusting at least one timing parameter of the page operations include adjusting the duration X of the transmission of the page, adjusting the duration Y of the scanning for the page response, and adding an offset to the page operation cycles by, for example, inserting a blank interval (e.g., an interval where both the transmission of the page and the scanning for the page response are suspended) between page operations or between the transmission of the page in one page operation and the response scan of the same page operation.

A consequence of applying an adjustment to at least one timing parameter associated with the page operations is to change the probability distribution for the delay D associated with wireless device A 102 successfully receiving a page response from wireless device B 104. As discussed in more detail further herein, the timing parameters of the page operations prior to the adjustment may result in a particular probability distribution for the delay D associated with wireless device A 102 successfully receiving a page response from wireless device B 104. By changing at least one timing parameter associated with the page operations, a more favorable probability distribution for the delay may be achieved.

The adjustment of the at least one timing parameter associated with the page operations may be performed in response to detecting a different wireless device. For example, the page operations prior to the timing adjustment may have been configured for paging wireless device B 104. Upon detection of a new wireless device C (not shown), wireless device A 102 adjusts at least one timing parameter of the page operations to achieve a more favorable paging delay distribution for wireless device C. For example, the paging operations prior to the adjustment may have been based on the period T of the page scans performed by wireless device B 104. However, upon detecting wireless device C and determining that the period of its paging scans is T1, where T1 is different than T, wireless device A 102 adjusts at least one timing parameter associated with the paging operations based on the period T1, to achieve a more favorable paging delay distribution for wireless device C.

The following examples illustrate how the adjustment of certain timing parameters of the page operations may shorten the delay associated with wireless device A 102 receiving a successful page response from wireless device B 104.

Figure 4A:
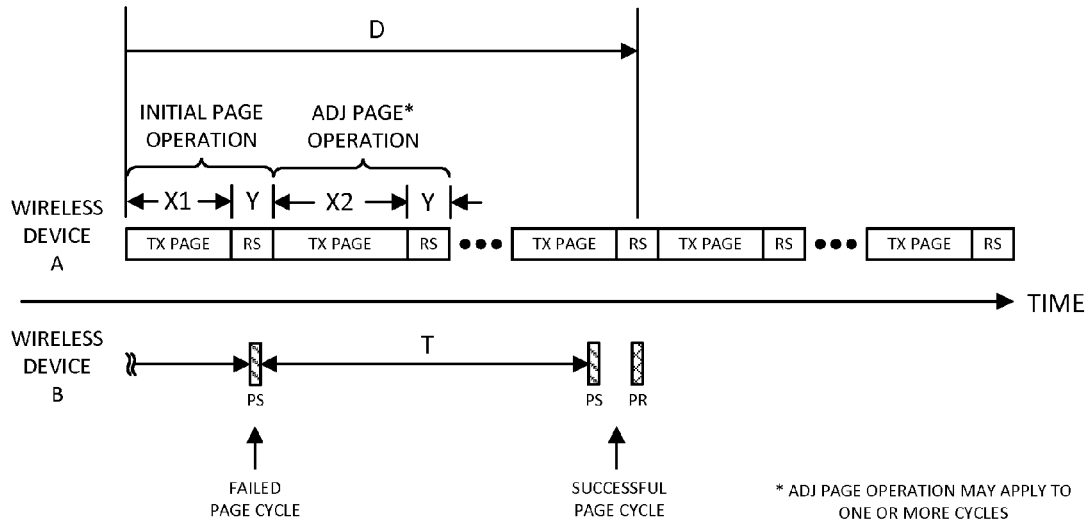
FIGS. 4A-4D illustrate timing diagrams related to various methods of paging a remote device in accordance with other aspects of the disclosure.

FIG. 4A illustrates a timing diagram related to an exemplary method of paging a remote device in accordance with another aspect of the disclosure. The timing diagram is similar to the timing diagram illustrated in FIG. 2, previously discussed. In this example, wireless device A 102 adjusts at least one timing parameter of the page operations, and in particular, adjusts the duration of the transmission of the page. For example, prior to the timing adjustment, wireless device A 102 configured each page operation with a page transmission interval having a duration X1 and a response scan interval having a duration Y.

While performing the page operations with the X1 and Y settings, wireless device A 102 determines that an adjustment of at least one timing parameter of the page operations is needed. As previously discussed, the basis for the adjustment may have been based on a newly determined characteristic of one or more page scans performed by wireless device B 104. Or, the basis for the adjustment may have been that the initial settings X1 and Y were configured for paging another device, and that during the course of performing the initial page operations, wireless device A 102 detected the presence of wireless device B 104, and consequently, adjusted the at least one timing parameter of the page operations based on a characteristic (e.g., period T) of one or more page scans performed by wireless device B 104.

In this example, wireless device A 102 adjusts the duration of the transmission of the page from X1 to X2 (e.g., where X2>X1). Thus, the adjusted page operation comprises a page transmission interval with a duration X2 and a response scan interval with a duration Y (in this example, the page scan duration Y was not changed). As indicated by the asterisk, wireless device A 102 may perform the adjustment for one or more cycles of page operations. As a consequence of the timing adjustment, the timing of subsequent intervals for the page transmission changes, which may result in a page transmission coinciding with a page scan at an earlier moment in time. For instance, in this example, a successful page cycle occurred at the second indicated page cycle due to the timing adjustment. Whereas, in the previous example of FIG. 2, where no timing adjustment was performed, a successful page cycle occurred at the third indicated page cycle. Thus, the delay associated with wireless device A 102 receiving a successful page response from wireless device B 104 has been shortened.

Figure 4B:
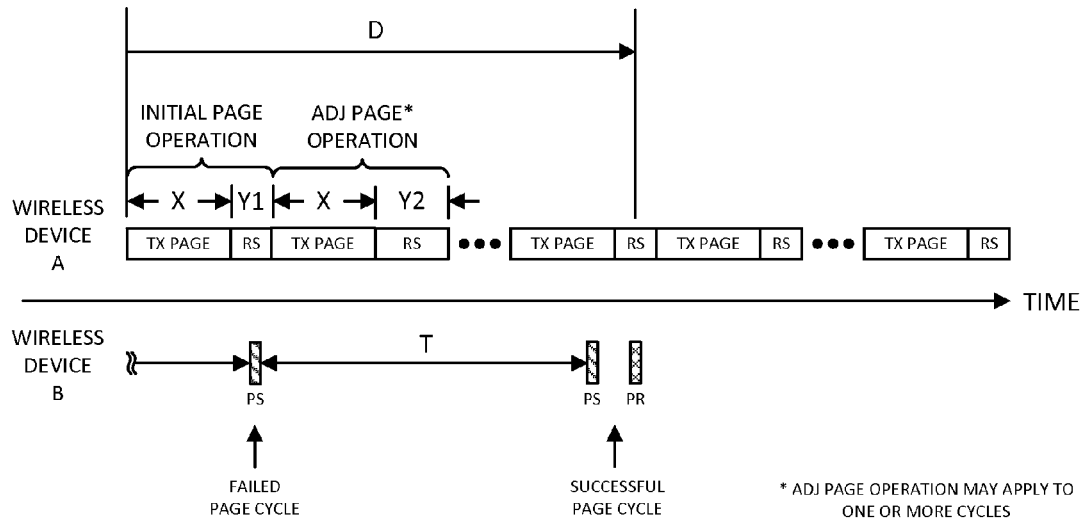

FIG. 4B illustrates a timing diagram related to another exemplary method of paging a remote device in accordance with another aspects of the disclosure. In the previous example of FIG. 4A, wireless device A 102 adjusted the duration X of the transmission of the page. In this example, wireless device A 102 adjusts the duration of the scanning for the page response. As shown, the initial page operation has a page transmission duration of X and a response scan duration of Y1. After the timing adjustment, the adjusted page operation has a page transmission duration of X and a response scan duration of Y2. Similar to the previous example, the delay in wireless device A 102 receiving a successful page response from wireless device B 104 may be substantially shortened due to the timing adjustment.

Figure 4C:
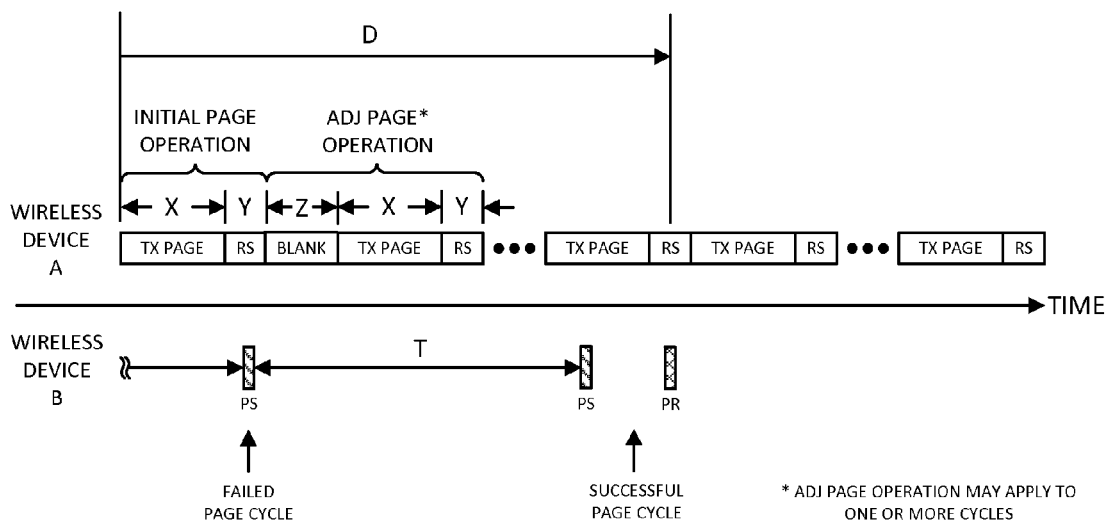

FIG. 4C illustrates a timing diagram related to another exemplary method of paging a remote device in accordance with another aspect of the disclosure. In the previous examples of FIGS. 4A-B, wireless device A 102 adjusted the duration X of the transmission of the page and the duration Y of the scanning for the page response, respectively. In this example, wireless device A 102 applies an offset to the page operations by inserting a blank interval in one or more page operations. As shown, the initial page operation has a page transmission duration of X and a response scan duration of Y. The adjusted page operation has a blank interval in addition to the page transmission interval X and the response scan interval Y. In a blank interval, wireless device may cease both transmitting the page and scanning for the page response. The blank interval changes the timing of the occurrence of subsequent page transmission intervals, which could result in shortening the delay associated with wireless device A 102 receiving a successful page response from wireless device B 104.

Figure 4D:
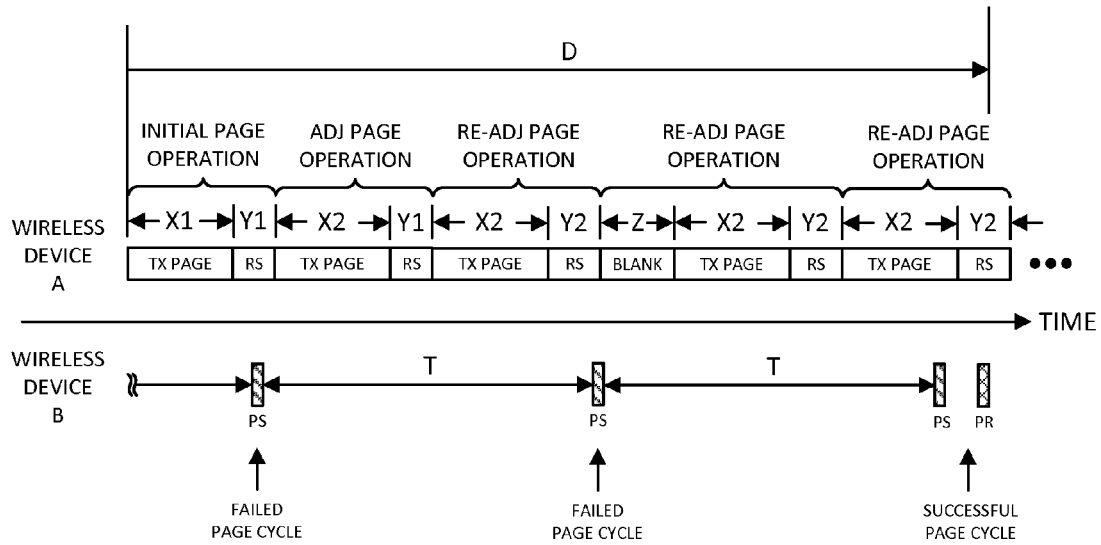

FIG. 4D illustrates a timing diagram related to another exemplary method of paging a remote device in accordance with another aspect of the disclosure. In the previous examples of FIGS. 4A-C, wireless device A 102 performed the same timing adjustment for one or more paging operations. In this example, wireless device A 102 continuously readjusts the page operations on a per cycle basis. For instance, the initial page operation has a page transmission duration of X1 and a response scan duration of Y1. For the second cycle, the wireless device A 102 performs an adjustment of the page operation so that it has a page transmission duration of X2 and a response scan duration of Y1. For the third cycle, the wireless device A 102 readjusts the page operation so that it has a page transmission duration of X2 and a response scan duration of Y2. For the fourth cycle, the wireless device A 102 readjusts the page operation so that it has a blank interval of Z, a page transmission duration of X2, and a response scan duration of Y2. For the fifth cycle, the wireless device A 102 readjusts the page operation so that it has a page transmission duration of X2 and a response scan duration of Y2.

It shall be understood that the re-adjustment could be of the same kind. That is, re-adjusting one parameter of the page operation, such as the duration of the page transmission. Or, as illustrated in the example of FIG. 4D, the re-adjustment may be of different kinds. That is, adjusting the duration of the page transmissions, adjusting the duration of the response scans, and inserting blank intervals in the page operations. As with the other timing adjustment examples, the delay in wireless device A 102 successfully receiving a page response from wireless device B 104 may be substantially shortened due to the timing adjustment and re-adjustment.

Figure 5:
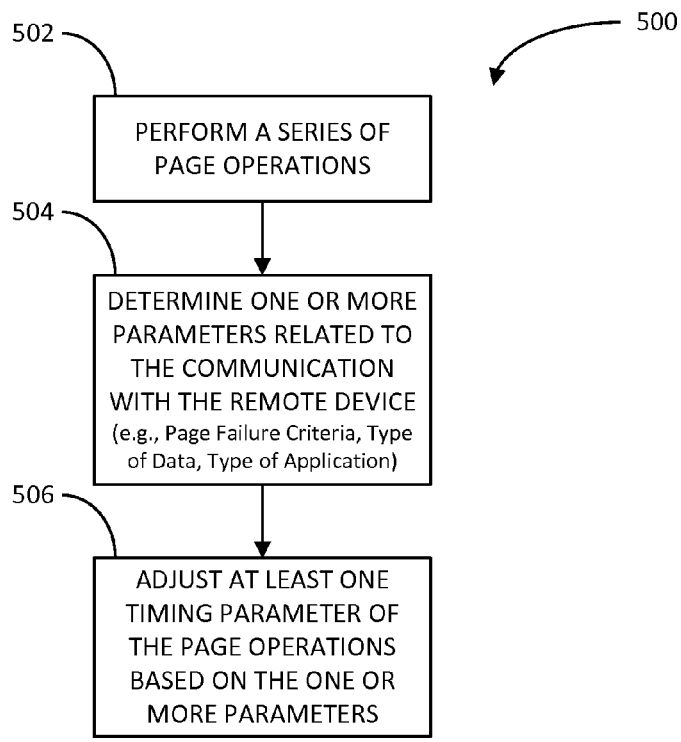
FIG. 5 illustrates a flow diagram of another exemplary method of paging a remote device in accordance with another aspect of the disclosure.

FIG. 5 illustrates a flow diagram of another exemplary method 500 of paging a remote device in accordance with another aspect of the disclosure. As previously discussed with reference to the method 200, wireless device A 102 may adjust at least one timing parameter of the series of page operations based on a characteristic of one or more page scans performed by wireless device B 104. However, in addition to the characteristic of one or more page scans, or in lieu of, the adjustment of the at least one timing parameter of the page operations may be based on other factors. The method 500 addresses examples of other factors on which the timing adjustment may be based.

In particular, according to the method 500, wireless device A 102 performs a series of page operations (block 502). As previously discussed, each page operation may comprise an interval for transmitting the page followed by an interval for scanning for the page response. Additionally, as previously discussed, the page operations may be performed in a repetitive and consecutive manner.

During the performance of the page operations, wireless device A 102 may determine one or more parameters related generally to current or future communication with wireless device B 104 (block 504). For example, one or more of those parameters may relate to a failure criteria associated with receiving a successful page response from wireless. As an example, the failure criteria may relate to the number of failed page operation cycles (e.g., one or more) that would require an adjustment of at least one timing parameter of the page operations.

Another one or more of those parameters may relate to the type of data for communication with wireless device B 104. As an example, wireless device A 102 may undertake a more aggressive (e.g., larger timing adjustments) and/or more frequent timing adjustments of the page operations for time-sensitive data. Still, another one or more of those parameters may relate to the type of application to be performed with wireless device B 104. As an example, wireless device A 102 may undertake a more aggressive and/or more frequent timing adjustments of the page operations for applications that require time-sensitive operations, such as gaming, multimedia, communications, and others.

Then, in accordance with method 500, wireless device A 102 adjusts at least one timing parameter associated with the page operations based on the one or more parameters related to current or future communication with wireless device B 104 (block 506). As previously discussed, examples of adjusting at least one timing parameter of the page operations include adjusting the duration X of the transmission of the page, adjusting the duration Y of the scanning for the page response, and adding an offset to the page operation cycles by, for example, inserting a blank interval (e.g., an interval where both the transmission of the page and the scanning for the page response are suspended). Also, as previously discussed, the timing adjustment may improve the probability of wireless device A 102 receiving a successful paging response from wireless device B 104 at an earlier time.

Figure 6:
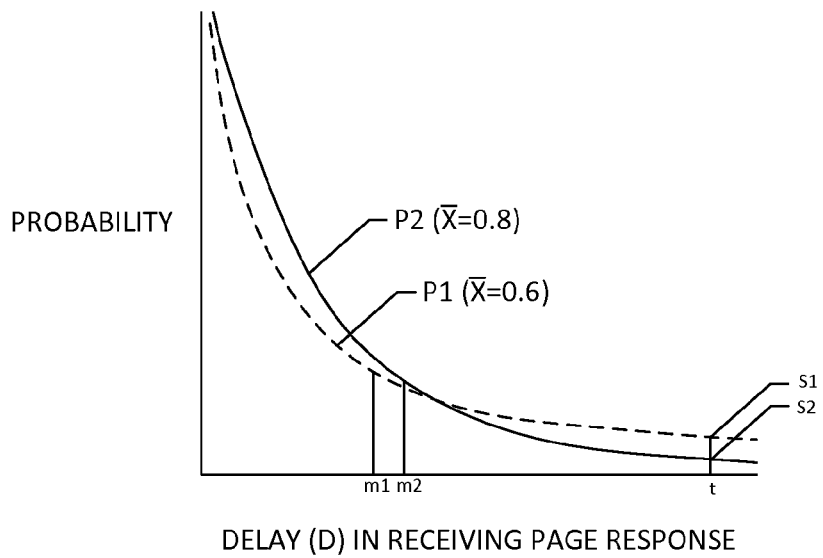
FIG. 6 illustrates a graph of exemplary paging delay probability distributions in accordance with another aspect of the disclosure.

FIG. 6 illustrates a graph of exemplary paging delay probability distributions in accordance with another aspect of the disclosure. As indicated, the vertical or y-axis of the graph represents probability associated with wireless device A 102 receiving a successful page response from wireless device B 104. The horizontal or x-axis of the graph represents the delay associated with wireless device A 102 receiving a successful page response from wireless device B 104. The illustrated probability distributions apply for the case where wireless device A 102 performs periodic page operations, each comprising a page transmission interval with duration X and a response scan interval with a duration of Y, and where wireless device B 104 performs periodic page scans with a period of T. Additionally, the page operations are performed independent of the page scans (e.g., the two operations are asynchronous).

The graph shows two probability distributions P1 and P2. Probability distribution P1 pertains to the case where the normalized duration $\overline{X}$ of the page transmission is 0.6 (e.g., $\overline{X}=X/X+Y$). Probability distribution P2 pertains to the case where the normalized duration $\overline{X}$ of the page transmission is 0.8. Note that the probability distribution varies as a function of the duration of the page transmission. For instance, when the duration of the page transmission is relatively small, the chance of a successful page cycle after the first attempt is relatively small; however, the corresponding delay is also relatively small due to the shorter page duration. On the other hand, when the duration of the page transmission is relatively large, the chance of a successful page after the first attempt is relatively high; however, the corresponding delay is also relatively large due to the longer page duration.

As illustrated, the probability distribution P1 pertaining to the shorter page transmission case ($\overline{X}=0.6$) has a corresponding mean delay m1 that is smaller than the corresponding mean delay m2 for the probability distribution P2 pertaining to the longer page transmission case ($\overline{X}=0.8$.). However, at a tail (t) region of the distributions, the probability distribution P1 pertaining to the shorter page transmission case ($\overline{X}=0.6$) has a probability s1 at that is higher than a corresponding probability s2 for the probability distribution P2 pertaining to the longer page transmission case ($\overline{X}=0.8$.).

Thus, the page operations may be configured to achieve a desired probability distribution for the delay associated with wireless device A 102 receiving a successful page response from wireless device B 104. For example, if achieving a smaller mean delay is more important while accepting more frequent occurrences of relatively large delays, then the page operations may be configured with a relatively small duration for the page transmissions. On the other hand, if achieving very few large delays is more important while accepting a relatively larger mean delay, then the page operations may be configured with a relatively longer duration for the page transmissions. In general, the page operations may be configured to achieve a desired probability distribution associated with the wireless device A 102 receiving a successful page response from wireless device B 104.

Figure 7:
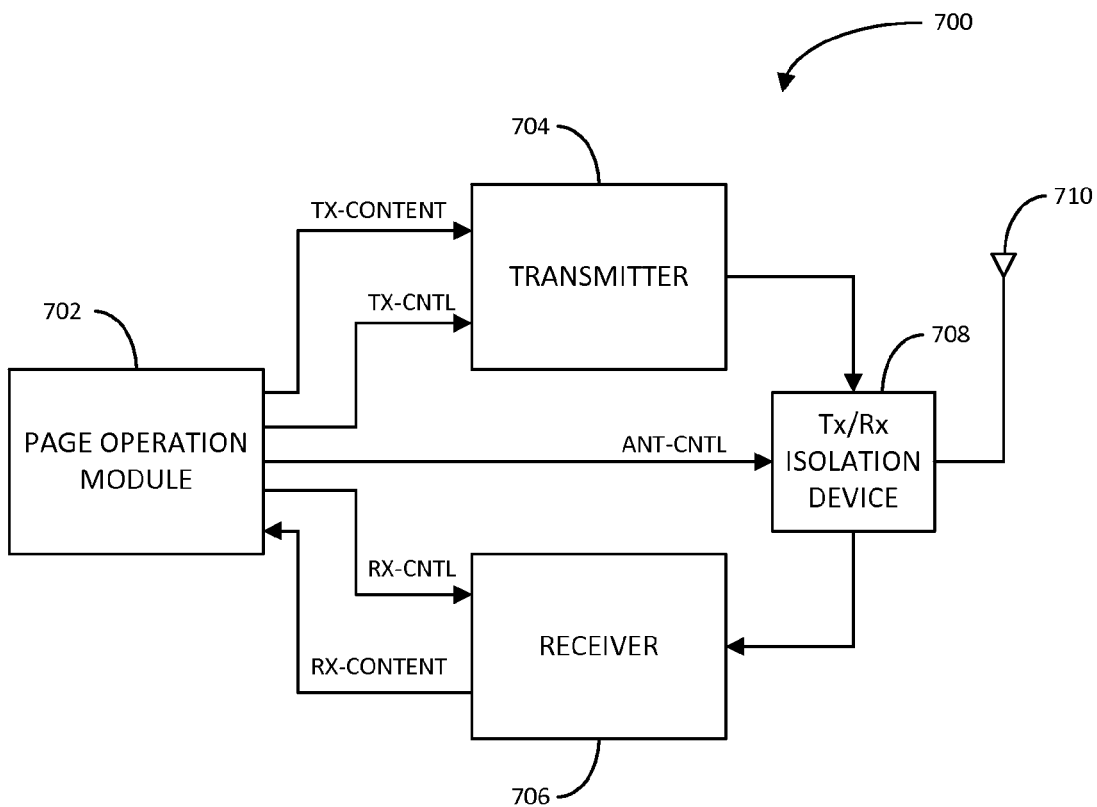
FIG. 7 illustrates a block diagram of an exemplary apparatus in accordance with another aspect of the disclosure.

FIG. 7 illustrates a block diagram of an exemplary apparatus 700 in accordance with another aspect of the disclosure. The apparatus 700 may be configured to implement one or more examples of the paging operations previously discussed. The apparatus 700 comprises a page operation module 702, a transmitter 704, a receiver 706, a Tx/Rx isolation device 708, and an antenna 710. Although each of these elements is shown as a single block, it shall be understood that each of them may comprise one or more components.

With regard to the transmission of a page, the page operation module 702 sends the page content (TX-CONTENT) to the transmitter 704 for transmitting the information to a remote device. The transmitter 704 processes the page content data to generate a modulated carrier for transmission via a wireless medium. The processing of the page content data may involve any one or more of the following: error correction coding, channel compensation coding, interleaving, encrypting, constellation mapping, and modulating. The modulation applied may be of any type, including pulse type modulation, such as pulse position modulation. The modulated carrier is sent to the antenna 710 from the transmitter 704 by way of the Tx/Rx isolation device 708 for transmission to a remote device via the wireless medium.

During transmission of the page, the page operation module 702 configures the transmitter 704, by way of control signal TX-CNTL, for transmission of the page (e.g., enables the transmitter). The page operation module 702 configures the Tx/Rx isolation device 708, by way of control signal ANT-CNTL, to couple the transmitter 704 to the antenna 710, and decouple or isolate the receiver 706 from the antenna 710. Additionally, the page operation module 702 configures to receiver 706, by way of control signal RX-CNTL, for not receiving a signal, such as a page response (e.g., disables the receiver).

With regard to the reception of a page response, a modulated carrier signal including the page response is received via the antenna 710 and sent to the receiver 706 by way of the Tx/Rx isolation device 708. The receiver 706 processes the signal to generate the page response content (RX-CONTENT). The processing of the page response signal may involve any one or more of the following: error correction decoding, channel compensation decoding, de-interleaving, decrypting, constellation de-mapping, and demodulating. The demodulation applied may be of any type, including pulse type demodulation, such as pulse position demodulation. The page operation module 702 processes the page response content in order to setup a communication channel with the remote device.

During reception of the page response, the page operation module 702 configures the transmitter 704, by way of control signal TX-CNTL, for not transmitting a signal, such as a page (e.g., disables the transmitter). The page operation module 702 configures the Tx/Rx isolation device 708, by way of control signal ANT-CNTL, to decouple or isolate the transmitter 704 from the antenna 710, and couple the antenna 710 to the receiver 706. Additionally, the page operation module 702 configures the receiver 706, by way of control signal RX-CNTL, for receiving a signal, such as a page response (e.g., enables the receiver).

The page operation module 702 may also be configured to determine a characteristic of one or more page scans performed by a remote device. As previously discussed, the characteristic may be the period of periodic page scans performed by the remote device. The page operation module 702 may determine the characteristic of one or more page scans performed by the remote device by engaging in a discovery procedure with the remote device or by accessing information from a standard defining the characteristic of one or more page scans performed by the remote device.

Figure 8:
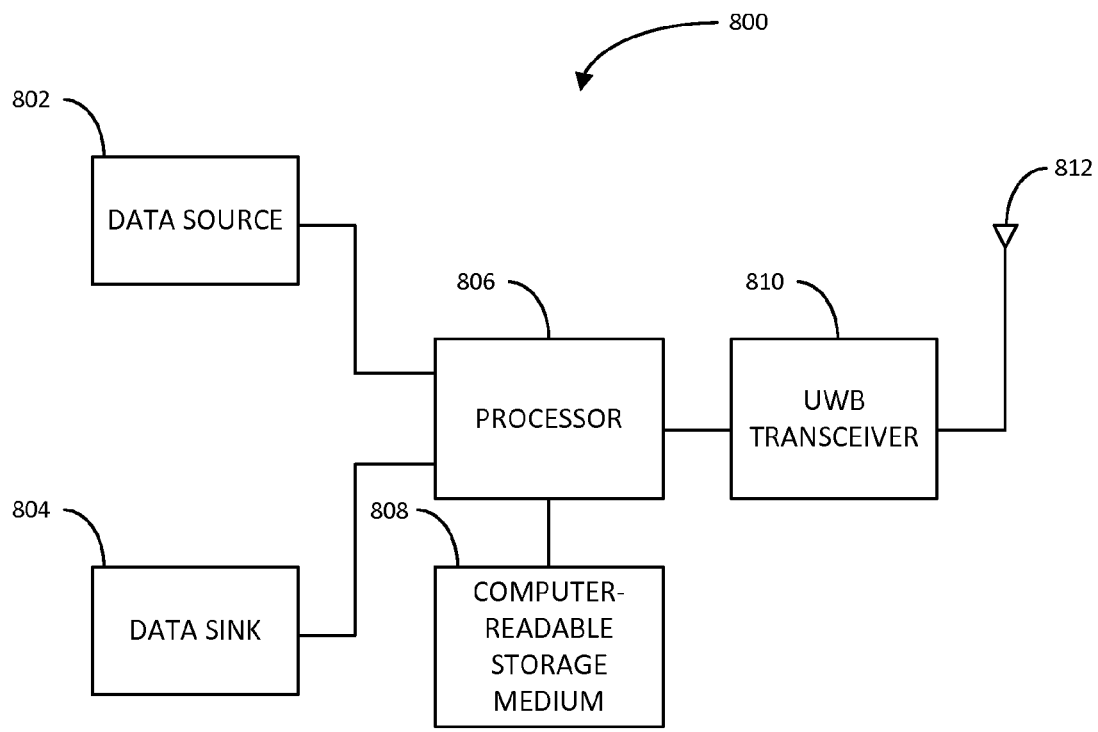
FIG. 8 illustrates a block diagram of another exemplary apparatus in accordance with another aspect of the disclosure.

FIG. 8 illustrates a block diagram of another exemplary apparatus 800 in accordance with another aspect of the disclosure. As previously discussed with reference to apparatus 700, an apparatus may implement any of the various paging operations described herein. Many distinct apparatuses, configured for distinct applications, may implement any of these various paging operations. The exemplary apparatus 800 is used herein to exemplify a few applications that the paging operations may be used in conjunction with.

In particular, the apparatus 800 comprises a data source 802, a data sink 804, a processor 806, a computer-readable storage medium 808, a transceiver (e.g., an ultra-wideband (UWB) transceiver) 810, and an antenna 812. The data source 802 provides data to the processor 806 to be processed for transmission to a remote device. The data sink 804 receives data, which originates from the remote device, from the processor 806. The processor 806, under the control of codes or instructions encoded in the computer-readable storage medium 808, performs the specified processes of the data in accordance with the application being implemented. The processor 806, also under the control of codes or instructions encoded in the computer-readable storage medium 808, performs any of the paging operations described herein, including determining a characteristic of one or more page scans performed by the remote device.

The UWB transceiver 810 generates a signal for transmission to a remote device by way of an antenna 812. The transmitted signal may include data originated from the data source 802 as well as page content data. The UWB transceiver 810 also processes a signal received from the remote device by way of the antenna 812. The received signal may include data to be sent to the data sink 804 as well as page response content data. The transmitted signal and the received signal may be modulated for information-transmitting purposes as well as for multiple access purposes (e.g., channel definition) using ultra-wideband (UWB) signals, such as a UWB pulse modulated signal. A UWB signal may be defined as having a fractional bandwidth on the order of 20% or more, a bandwidth on the order of 500 MHz or more, or a fractional bandwidth on the order of 20% or more and a bandwidth on the order of 500 MHz or more.

In terms of some example applications, the apparatus 800 may be configured as a headset. In such a case, the data source 802 may be configured as a transducer, such as a microphone, to generate audio data in response to detected sound, such as the voice of a user. The processor 806, transceiver 810, and antenna 812 are used collectively for transmitting the audio data to a remote device. The data sink 804 may be configured as a transducer, such as one or more speakers, to generate sound based on audio data received from the remote device by way of the antenna 812, transceiver 810, and processor 806.

In another example, the apparatus 800 may be configured as a watch. In such a case, the data source 802 may be configured as a user interface, such as a keyboard, to generate data. The processor 806, transceiver 810, and antenna 812 are used collectively for transmitting the data to a remote device. The data sink 804 may be configured as a user interface, such as a display, to generate a visual indication based on data received from the remote device by way of the antenna 812, transceiver 810, and processor 806.

In yet another example, the apparatus 800 may be configured as a sensing device. In such a case, the data source 802 may be configured as a sensor, such as a physiological sensor, to generate sensed data. The processor 806, transceiver 810, and antenna 812 are used collectively for transmitting the sensed data to a remote device. The data sink 804 may be configured as a controlling device, such as a processor or controller, to control the sensing operation based on data received from the remote device by way of the antenna 812, transceiver 810, and processor 806.

Figure 9:
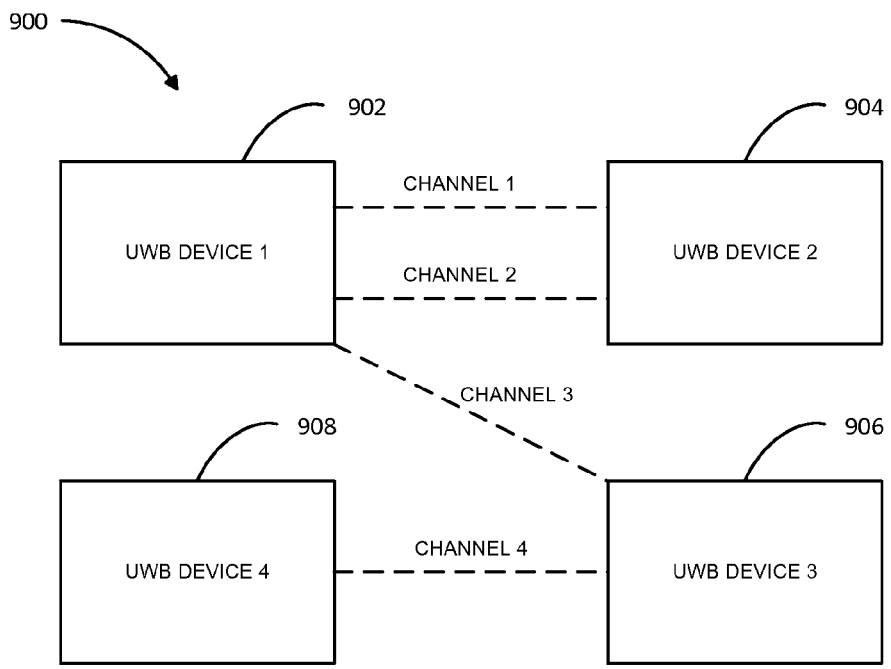
FIG. 9 illustrates a block diagram of an exemplary network in accordance with another aspect of the disclosure.

FIG. 9 illustrates a block diagram of a network 900 of various ultra-wide band (UWB) communications devices communicating with each other via various channels in accordance with another aspect of the disclosure. The apparatuses described herein may communicate with each other by way of a network. The network 900 may be setup in distinct manners and used in distinct applications. For example, the network 900 may be a peer-to-peer type network, an ad hoc type network, a master-slave type network, or other type of network. Additionally, the network 900 may be configured as a wideband personal area network (WPAN), a wideband body area network (WBAN), or other application type network.

In this example, UWB device 1 902 is communicating with UWB device 2 904 via two concurrent UWB channels 1 and 2. UWB device 902 is communicating with UWB device 3 906 via a single channel 3. And, UWB device 3 906 is, in turn, communicating with UWB device 4 908 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

A processing system may include hardware, software, firmware or any combination thereof. The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. In some aspects, a computer-readable medium comprises codes executable to perform one or more operations as taught herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of controlling a delay distribution associated with receiving a response to a page, comprising:
    performing a series of page operations, wherein each page operation comprises transmitting a page and scanning for a page response; and adjusting at least one timing parameter associated with performing the series of page operations based on a characteristic of occurrences of separate scans for the page performed by at least one remote device, wherein prior to the adjusting, a timing of the page operations is based on another characteristic of occurrences of separate page scans performed by another remote device.

2. The method of claim 1, wherein the at least one timing parameter comprises a duration of the transmission of the page.

3. The method of claim 1, wherein the at least one timing parameter comprises a duration of the scanning for the page response.

4. The method of claim 1, further comprising readjusting the at least one timing parameter over time in an attempt to receive the page response from the at least one remote device.

5. The method of claim 1, wherein adjusting the at least one timing parameter is based on a failure to receive the page response from the at least one remote device.

6. The method of claim 1, wherein adjusting the at least one timing parameter is based on a type of data for communication with the at least one remote device.

7. The method of claim 1, wherein adjusting the at least one timing parameter is based on a type of application to be performed by the at least one remote device.

8. The method of claim 1, wherein the separate page scans performed by the at least one remote device comprises periodic page scans, and wherein the characteristic of the occurrences of separate page scans comprises a period of the periodic page scans.

9. The method of claim 8, further comprising determining the period of the periodic page scans.

10. The method of claim 9, wherein the period of the periodic page scans is determined in response to a discovery paging procedure performed with the at least one remote device.

11. The method of claim 9, wherein the period of the periodic page scans is determined based on a standard.

12. The method of claim 1, wherein adjusting the at least one timing parameter is based on information related to a probability distribution associated with a delay in receiving the page response.

13. The method of claim 1, wherein transmitting the page comprises transmitting the page by way of a wireless communication channel, and wherein receiving the page response comprises receiving the page response by way of the wireless communication channel.

14. The method of claim 1, further comprising suspending the transmission of the page during the scanning for the page response, and suspending the scanning for the page response during the transmission of the page.

15. The method of claim 1, wherein a timing of the page operations is independent of the occurrences of the separate page scans performed by the at least one remote device.

16. The method of claim 1, wherein adjusting the at least one timing parameter comprises adjusting the at least one timing parameter using information describing the characteristic of the occurrences of separate scans for the page performed by at least one remote device.

17. The method of claim 16, wherein the separate scans for the page comprises periodic page scans, and wherein the information describing the characteristic of the occurrences of separate scans for the page comprises information describing a period of the periodic page scans.

18. The method of claim 1, wherein the series of page operations are periodic with an associated first period, wherein the occurrences of separate scans for the page are periodic with an associated second period, the first period being less than the second period, and the periodic page operations being performed asynchronous with the periodic page scans.

19. The method of claim 18, wherein each of the periodic page operations comprises a first interval for transmitting the page and not scanning for the page response, and a second interval for scanning for the page response and not transmitting the page, the first and second intervals being non-overlapping.

20. The method of claim 19, wherein prior to adjusting the at least one timing parameter, the first and second intervals occupy an entire duration of each periodic page operation, and wherein adjusting the at least one timing parameter comprises inserting a third interval into at least one of the periodic page operations, the transmitting of the page and the scanning for the page response being suspended during the third interval.

21. The method of claim 18, wherein adjusting the at least one timing parameter comprises adjusting the at least one timing parameter on a per cycle basis of the periodic page operations.

22. An apparatus for controlling a delay distribution associated with receiving a response to a page, comprising:
a page operation module configured to:
perform a series of page operations, wherein each page operation comprises a transmission of a page and a scan for a page response; and
adjust at least one timing parameter associated with the series of page operations based on a characteristic of occurrences of separate scans for the page performed by at least one remote device, wherein, prior to the adjustment of the at least one timing parameter, a timing of the page operations is based on another characteristic of occurrences of separate page scans performed by another remote device.

23. The apparatus of claim 22, wherein the at least one timing parameter comprises a duration of the transmission of the page.

24. The apparatus of claim 22, wherein the at least one timing parameter comprises a duration of the scanning for the page response.

25. The apparatus of claim 22, wherein the page operation module is further configured to readjust the at least one timing parameter over time in an attempt to receive the page response from the at least one remote device.

26. The apparatus of claim 22, wherein the page operation module is further configured to adjust the at least one timing parameter based on a failure to receive the page response from the at least one remote device.

27. The apparatus of claim 22, wherein the page operation module is configured to adjust the at least one timing parameter based on a type of data for communication with the at least one remote device.

28. The apparatus of claim 22, wherein the page operation module is configured to adjust the at least one timing parameter based on a type of application to be performed with the at least one remote device.

29. The apparatus of claim 22, wherein the separate page scans performed by the at least one remote device comprises periodic page scans, and wherein the characteristic of the occurrences of separate page scans comprises a period of the periodic page scans.

30. The apparatus of claim 29, wherein the page operation module is further configured to determine the period of the periodic page scans.

31. The apparatus of claim 30, wherein the period of the periodic page scans is determined in response to a discovery paging procedure performed with the at least one remote device.

32. The apparatus of claim 30, wherein the period of the periodic page scans is determined based on a standard.

33. The apparatus of claim 22, wherein the page operation module is further configured to adjust the at least one timing parameter based on information related to a probability distribution associated with a delay in receiving the page response.

34. The apparatus of claim 22, wherein the transmitter is configured to transmit the page by way of a wireless communication channel, and wherein the receiver is configured to receive the page response by way of the wireless communication channel.

35. The apparatus of claim 22, wherein the transmitter is configured to suspend the transmission of the page during scans for the page response by the receiver, and the receiver is configured to suspend the scan for the page response during the transmission of the page by the transmitter.

36. The apparatus of claim 22, wherein a timing of the page operations is independent of the occurrences of the separate page scans performed by the at least one remote device.

37. An apparatus for controlling a delay distribution associated with receiving a response to a page, comprising:
   means for performing a series of page operations, wherein each page operation comprises transmitting a page and scanning for a page response;
   means for adjusting at least one timing parameter associated with performing the series of page operations based on a characteristic of occurrences of separate scans for the page performed by at least one remote device, wherein prior to the adjusting, a timing of the page operations are based on another characteristic of occurrences of separate page scans performed by another remote device;
   means for transmitting the page to the at least one remote device; and
   means for receiving the page response from the at least one remote device.

38. The apparatus of claim 37, wherein the at least one timing parameter comprises a duration of the transmission of the page.

39. The apparatus of claim 37, wherein the at least one timing parameter comprises a duration of the scanning for the page response.

40. The apparatus of claim 37, wherein prior to the adjusting, a timing of the page operations are based on another characteristic of occurrences of separate page scans performed by another remote device.

41. The apparatus of claim 37, wherein the means for adjusting is configured to readjust the at least one timing parameter over time in an attempt to receive the page response from the at least one remote device.

42. The apparatus of claim 37, wherein the means for adjusting is configured to adjust the at least one timing parameter based on a failure to receive the page response from the at least one remote device.

43. The apparatus of claim 37, wherein the means for adjusting is configured to adjust the at least one timing parameter based on a type of data for communication with the at least one remote device.

44. The apparatus of claim 37, wherein the means for adjusting is configured to adjust the at least one timing parameter based on a type of application to be performed with the at least one remote device.

45. The apparatus of claim 37, wherein the separate page scans performed by the at least one remote device comprises periodic page scans, and wherein the characteristic of the occurrences of separate page scans comprises a period of the periodic page scans.

46. The apparatus of claim 45, further comprising means for determining the period of the periodic page scans.

47. The apparatus of claim 46, wherein the means for determining is configured to determine a period of the periodic page scans in response to a discovery paging procedure performed with the at least one remote device.

48. The apparatus of claim 46, wherein the means for determining is configured to determine a period of the periodic page scans based on a standard.

49. The apparatus of claim 37, wherein adjusting the at least one timing parameter is based on information related to a probability distribution associated with a delay in receiving the page response.

50. The apparatus of claim 37, wherein the means for transmitting is configured to transmit the page by way of a wireless communication channel, and wherein the means for receiving is configured to receive the page response by way of the wireless communication channel.

51. The apparatus of claim 37, wherein the means for transmitting is configured to suspend the transmission of the page during the scan for the page response by the means for receiving, and wherein the means for receiving is configured to suspend the scanning for the page response during the transmission of the page by the means for transmitting.

52. The apparatus of claim 37, wherein a timing of the page operations is independent of the occurrences of the separate page scans performed by the at least one remote device.

53. A non-transitory computer program product, comprising:
   a computer-readable storage medium encoded with codes executable by a processor to: perform a series of page operations, wherein each page operation comprises transmitting a page and scanning for a page response; and
   adjust at least one timing parameter associated with performing the series of page operations based on a characteristic of occurrences of separate scans for the page performed by at least one remote device, wherein, prior to the adjustment of the at least one timing parameter, a timing of the page operations is based on another characteristic of occurrences of separate page scans performed by another remote device.

54. A headset, comprising:
   a page operation module configured to:
      perform a series of page operations, wherein each page operation comprises a transmission of a page and a scan for a page response; and
      adjust at least one timing parameter associated with the series of page operations based on a characteristic of occurrences of separate scans for the page performed by at least one remote device, wherein, prior to the adjustment of the at least one timing parameter, a timing of the page operations is based on another characteristic of occurrences of separate page scans performed by another remote device;
   a transmitter configured to transmit the page to the at least one remote device;
   a receiver configured to scan for the page response from the at least one remote device; and
   a transducer configured to generate sound based on data received from the at least one remote device.

55. A watch, comprising:
a page operation module configured to:
- perform a series of page operations, wherein each page operation comprises a transmission of a page and a scan for a page response; and
- adjust at least one timing parameter associated with the series of page operations based on a characteristic of occurrences of separate scans for the page performed by at least one remote device, wherein, prior to the adjustment of the at least one timing parameter, a timing of the page operations is based on another characteristic of occurrences of separate page scans performed by another remote device;

a transmitter configured to transmit the page to the at least one remote device;
a receiver configured to scan for the page response from the at least one remote device; and
a user interface configured to generate an indication based on data received from the at least one remote device.

56. A sensing device, comprising:
a page operation module configured to:
- perform a series of page operations, wherein each page operation comprises a transmission of a page and a scan for a page response; and
- adjust at least one timing parameter associated with the series of page operations based on a characteristic of occurrences of separate scans for the page performed by at least one remote device, wherein, prior to the adjustment of the at least one timing parameter, a timing of the page operations is based on another characteristic of occurrences of separate page scans performed by another remote device;

a transmitter configured to transmit the page to the at least one remote device;
a receiver configured to scan for the page response from the at least one remote device; and
a sensor configured to generate data for transmission to the at least one remote device.

* * * * *